United States Patent
Wong

[19]

[11] Patent Number: 5,950,554
[45] Date of Patent: Sep. 14, 1999

[54] PUCKER FREE YOKE-TO-FRONT AND YOKE-TO-BACK GARMENT SEAM AND METHOD FOR PRODUCTION

[75] Inventor: John Wong, Cote St. Luc, Canada

[73] Assignee: Taltech Ltd., Virgin Islands (Br.)

[21] Appl. No.: 08/782,004

[22] Filed: Jan. 6, 1997

Related U.S. Application Data

[63] Continuation-in-part of application No. 08/613,656, Mar. 11, 1996, Pat. No. 5,590,615, which is a continuation of application No. 08/245,122, May 17, 1994, Pat. No. 5,568,779.

[51] Int. Cl.$^6$ .............. D05B 1/18; A41D 27/10; B32B 7/08; B32B 7/12
[52] U.S. Cl. .............. 112/475.09; 112/441; 2/125; 2/275; 156/93
[58] Field of Search .............. 112/441, 475.09, 112/418; 2/122, 123, 275; 156/93

[56] References Cited

U.S. PATENT DOCUMENTS

| | | |
|---|---|---|
| 1,706,461 | 3/1929 | Oathout . |
| 1,784,942 | 12/1930 | Miller . |
| 1,862,377 | 6/1932 | Harper ............... 112/441 X |
| 2,120,458 | 6/1938 | Bodle . |
| 2,240,902 | 5/1941 | Fishman . |
| 2,264,224 | 11/1941 | Swan . |
| 2,266,953 | 12/1941 | Blue . |
| 2,508,331 | 5/1950 | Dunlap ............... 2/122 |
| 2,719,803 | 10/1955 | Nottebohm . |
| 2,731,788 | 1/1956 | Donaldson, Jr. . |
| 2,855,606 | 10/1958 | Berg . |
| 2,925,642 | 2/1960 | Pfeffer, Jr. . |
| 2,937,380 | 5/1960 | Reese . |
| 2,988,457 | 6/1961 | Gatcomb . |
| 3,094,705 | 6/1963 | Reid et al. . |
| 3,399,642 | 9/1968 | Etchison et al. . |
| 3,453,662 | 7/1969 | Weiss . |
| 3,629,866 | 12/1971 | Blue ............... 2/132 |
| 4,077,066 | 3/1978 | Weiss . |
| 4,549,916 | 10/1985 | Off et al. . |
| 4,561,128 | 12/1985 | Zimmerman . |
| 4,593,418 | 6/1986 | Simon ............... 112/418 X |
| 4,803,109 | 2/1989 | Saniscalchi . |
| 5,003,902 | 4/1991 | Benstock et al. . |
| 5,063,101 | 11/1991 | Grynaeus et al. . |
| 5,568,779 | 10/1996 | Wong . |
| 5,590,615 | 1/1997 | Wong . |
| 5,775,394 | 7/1998 | Wong ............... 112/441 |

FOREIGN PATENT DOCUMENTS

| | | |
|---|---|---|
| 0 791 674 A1 | 8/1997 | European Pat. Off. . |
| 1104802 | 12/1958 | Germany . |
| 08209419 | 8/1996 | Japan . |
| 641576 | 8/1950 | United Kingdom . |
| 2 030 844 | 4/1980 | United Kingdom . |

*Primary Examiner*—Ismael Izaguirre
*Attorney, Agent, or Firm*—Kile McIntyre & Harbin

[57] ABSTRACT

A pucker free garment seam providing a garment with a tailored and wrinkle free appearance. The pucker free seam and method for production utilizes a bonding strip which contains at least a thermal adhesive component which is inserted between opposing surface of a garment component along the seam. A sufficient amount of heat and pressure is applied to the seam which causes the adhesive of the bonding strip to flow onto the surfaces of the garment component thereby creating a compressed seam and permanently bonding the surfaces of the garment component together along the seam to eliminate puckering associated with shrinkage of sewing thread at the seam.

62 Claims, 2 Drawing Sheets

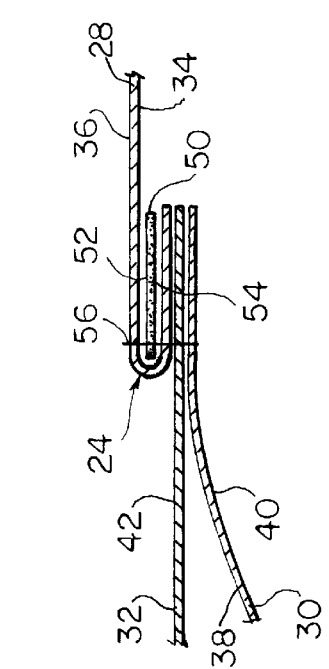
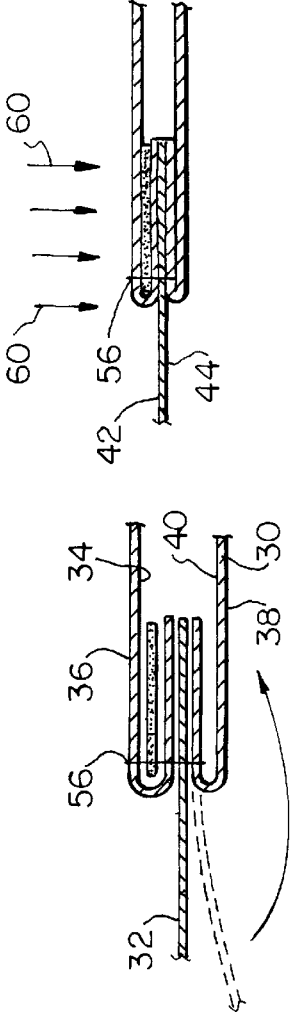
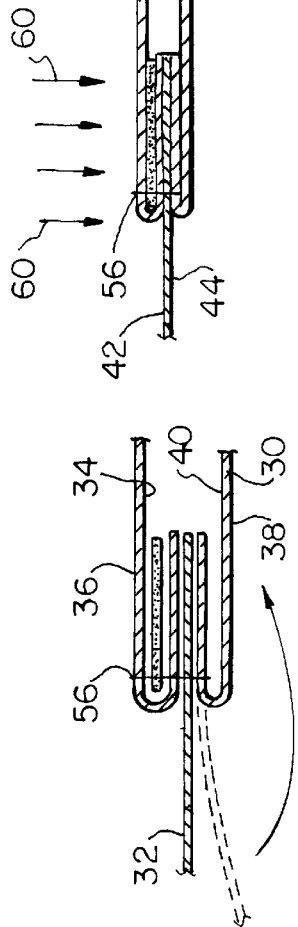
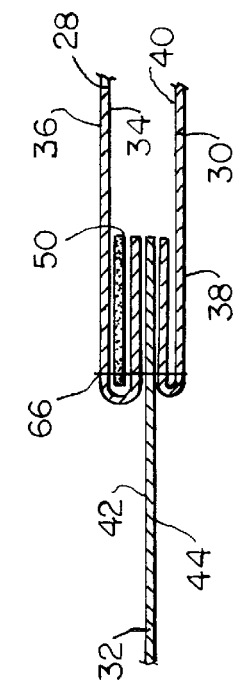
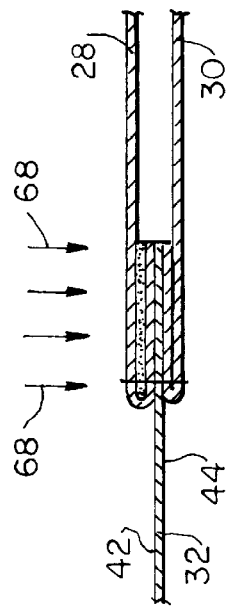

PUCKER FREE YOKE-TO-FRONT AND YOKE-TO-BACK GARMENT SEAM AND METHOD FOR PRODUCTION

RELATED INVENTION

This application is a continuation-in-part of applicant's prior copending application Ser. No. 08/613,656, filed Mar. 11, 1996, entitled "Pucker Free Garment Seam and Method of Manufacture" now U.S. Pat. No. 5,590,615 which is a continuation of applicant's prior application Ser. No. 08/245,122, filed May 17, 1994 entitled "Pucker Free Garment Seam and Method of Manufacture" now U.S. Pat. No. 5,568,779, all of common assignment herewith.

BACKGROUND OF THE INVENTION

The present invention relates to a pucker free garment seam and method for production. More specifically, the invention is directed to an improved garment yoke seam and method for production which facilely eliminates a tendency of the seam to bunch or pucker at a shoulder yoke area and other similar areas following conventional laundering procedures.

A puckering phenomenon at seam lines has long plagued the garment industry. Seam pucker is typically caused by thread shrinkage which occurs during laundering of a garment. In particular, after a garment is purchased by a garment consumer it is subjected to laundering cycles as the shirt is worn and becomes soiled. During these laundering and drying cycles the sewing thread typically undergoes longitudinal shrinkage. It is this shrinkage, at a rate greater than the surrounding shirt material, that creates puckering at a seam joining two panels of fabric. In this, the sewing thread contracts upon being laundered and pulls on opposing garment components at the garment yoke seam which in turn causes the garment components to buckle and thereby create wrinkles along the yoke seam. This effect is noticeable in the yoke-to-front and yoke-to-back seams of a dress shirt which connect the front and back panels of the shirt to a top of the shoulder or yoke portion of the shirt. Accordingly, it would be highly desirable to provide a method for production and garment which would be free of pucker phenomenon in the yoke region of a shirt. Moreover, it would be desirable to maintain a yoke seam which would be smooth and pucker free even after multiple laundering operations.

Several attempts have been made to reduce seam pucker in dress shirts. One such attempt utilizes an interlining having a thermoplastic component in the interlining matrix. During the manufacture process the seam is ironed which reduces the cross-sectional thickness of the seam along the stitch line. The reduced thickness allows for slack in the sewing thread such that during subsequent laundering the sewing thread is permitted to shrink an amount equal to the slack. This technique is not entirely effective in reducing seam pucker. First, the garment components sewn together at the seam are allowed to pull apart between outer stitches of the seam which results in buckling of the garment fabric. Second, the thread which is compressed in the interlining matrix becomes bound within the matrix thus shrinkage of the thread still results in at least a degree of seam pucker. Third, manufacturing an interlining results in an overall increase in garment manufacturing cost. This cost is compounded if the interlining is a composite interlining.

Another prior attempt at reducing seam pucker utilizes special garment material. Specifically, the garment components sewn together at the seam are manufactured from material which stretches during the sewing process and which relaxes after the sewing process is complete. This relaxation provides for slack in the sewing thread. This attempt is also ineffective at reducing seam pucker. First, as before, the garment components sewn together at the seam are allowed to pull apart between outer stitches of the seam which results in buckling of the garment fabric. Second, only garments manufactured from certain stretch materials may be utilized to manufacture the garments. The disadvantages associated with this are clear.

Still other prior art attempts alter the nature of the sewing thread used in the sewing process. For example, one such attempt utilizes a composite sewing thread whereby one component of the thread is water soluble. During the laundering process the water soluble component dissolves thereby creating slack in the sewing thread which compensates for thread shrinkage. First, as before, the garment components sewn together at the seam are allowed to pull apart between outer stitches of the seam which results in buckling of the garment fabric. Second, the high cost of manufacturing a sewing thread altered in this way increases the overall garment cost. Third, thread strength can be compromised by composite design. Last, commercial sewing machines are not well adapted to utilize altered thread. Other prior art attempts which alter the nature of the sewing thread are not believed to be fully effective for the same noted reasons.

The difficulties and limitations suggested in the preceding are not intended to be exhaustive, but rather are among many which demonstrate that although significant attention has been devoted to reducing pucker in garment seams, puckerless garment seams and method for production appearing in the past will admit to worthwhile improvement.

OBJECTS AND BRIEF SUMMARY OF THE INVENTION

It is therefore a general object of the invention to provide a novel, smooth garment seam, at a yoke region of a shirt, and method for production which will obviate or minimize difficulties of the type previously described.

It is a specific object of the invention to provide a smooth garment yoke seam and method for production which will eliminate seam pucker at a yoke region of a shirt.

It is another object of the invention to provide a smooth garment yoke seam and method for production which may be used in a variety of garments to provide a pucker free tailored appearance.

It is still another object of the invention to provide a smooth garment seam and method for production for advantageous use in the yoke-to-front and yoke-to-backs seams of a dress shirt which connect the front and back panels of the shirt to the yoke portion of the shirt.

It is yet another object of the invention to provide a smooth garment yoke seam and method for production which provides for a cost effective solution to seam pucker and does not involve significant modification of existing production apparatus.

BRIEF SUMMARY OF A PREFERRED EMBODIMENT OF THE INVENTION

A preferred embodiment of the invention which is intended to accomplish the foregoing objects includes a bonding strip which contains at least a thermal adhesive component which is inserted between surfaces of a first garment component along a yoke seam line of a garment. The seam is subjected to a sufficient amount of heat and pressure to cause the adhesive of the bonding strip to flow over the surfaces of the garment component thereby creating a compressed seam and permanently bonding the first garment component together along the yoke seam to eliminate puckering associated with sewing thread shrinkage.

DRAWINGS

Other objects and advantages of the present invention will become apparent from the following detailed description of a preferred embodiment thereof taken in conjunction with the accompanying drawings, wherein:

FIGS. 3a through 3c show a cross-sectional sequence view of a method for producing the yoke-to-front and yoke-to-back seams of a dress shirt in accordance with the present invention; and FIGS. 4a and 4b show an alternative embodiment of the present invention.

DETAILED DESCRIPTION

Figure 1:
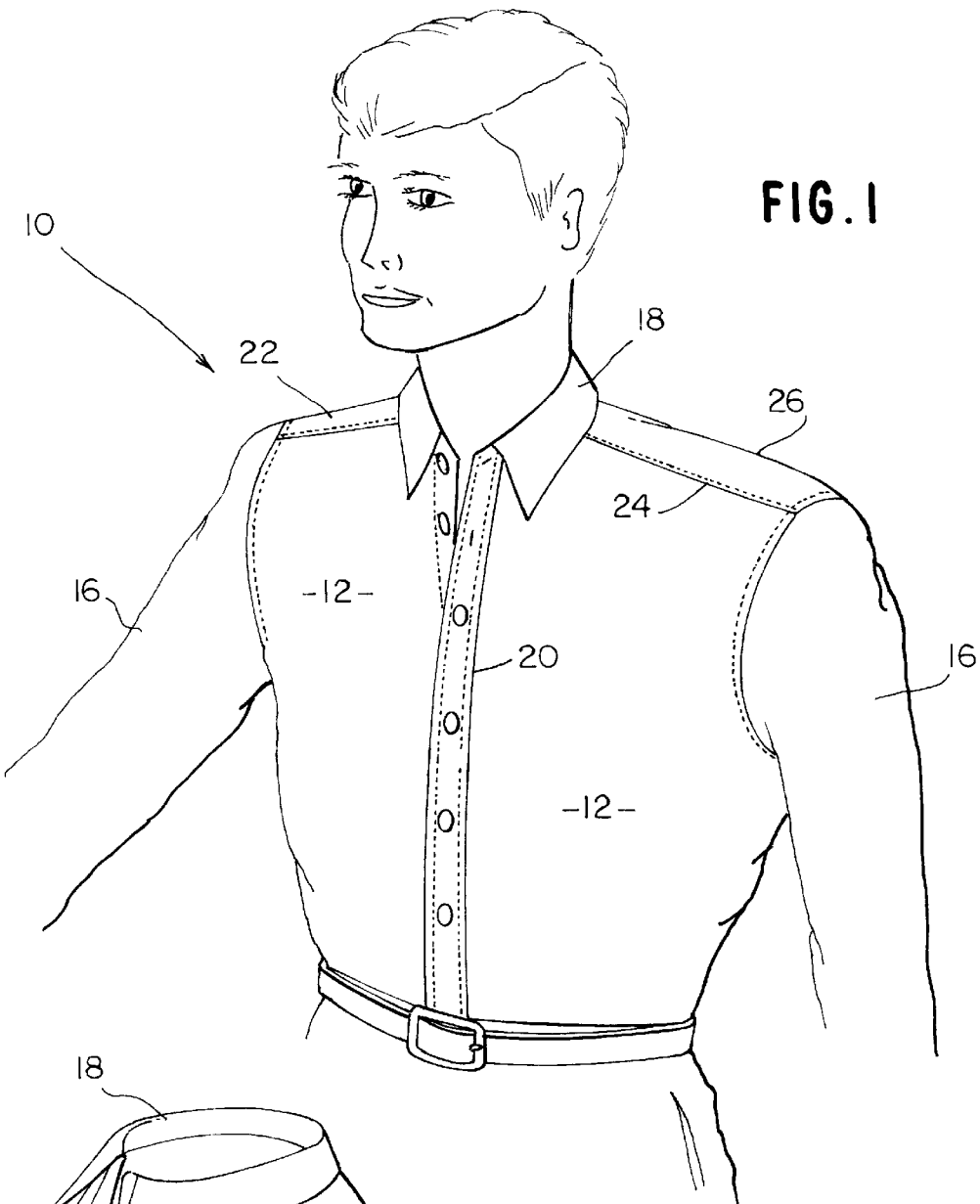
FIG. 1 is a pictorial view showing a human figure wearing a shirt having at least a yoke seam produced in accordance with the present invention.
Figure 2:
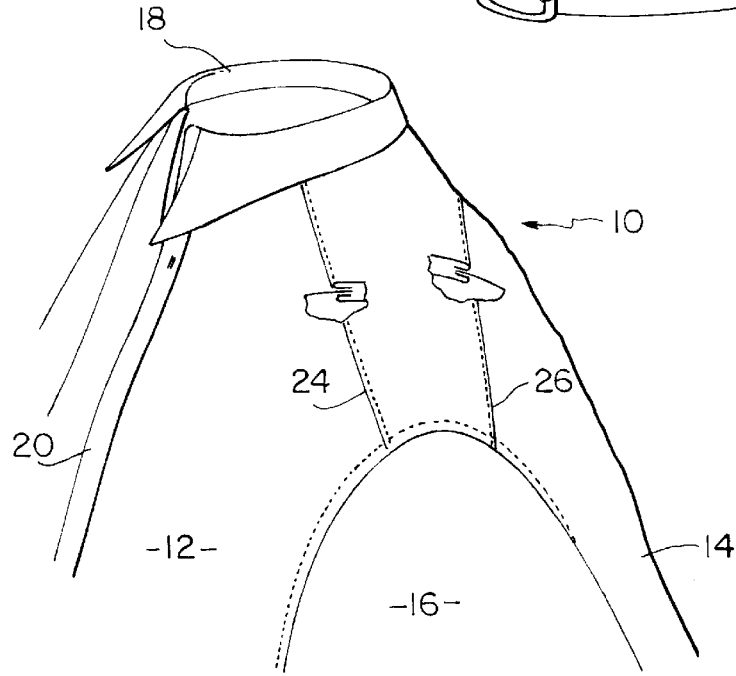
FIG. 2 is a segmental view which illustrates the yoke-to-front and yoke-to-back seams of the dress shirt depicted in FIG. 1 in which the yoke-to-front and yoke-to-back seams have been produced in accordance with the present invention.

Referring now to the drawings, and particularly to FIGS. 1 and 2, there is shown a human male figure wearing a dress shirt 10 having front panels 12, a back panel 14 (note FIG. 2), sleeves 16, a collar 18, a central button placket 20 and a shoulder yoke 22. The present invention is directed to a yoke-to-front seam 24 and yoke-to-back seam 26 which are smooth and pucker free even after numerous laundering procedures.

FIG. 2 shows a side segmental view of a yoke region 22 of the dress shirt 10 depicted in FIG. 1. The shirt yoke 22 is connected to the front panel 12 along a yoke-to-front seam 24 in accordance with a preferred embodiment of the invention. Similarly, the shirt yoke 22 is connected to the rear panel 14 along a yoke-to-back seam 26 in accordance with a preferred embodiment of the invention. Although the specific embodiment as shown in the figures is directed to the yoke-to-front 24 and yoke-to-back 26 seams of a dress shirt 10, it is to be understood that the seam and method for production of the present invention may be advantageously utilized in other regions of a garment as desired. The phenomenon of seam pucker, however, is troubling in the yoke-to-front 24 and yoke-to-back 26 seams because of their visible location.

FIGS. 3a through 3c show the progressive production steps for producing the seams 24 or 26 of the present invention. FIG. 3c shows a cross-sectional view of a completed yoke-to-front 24 or yoke-to-back 26 seam produced in accordance with the present invention. The embodiment of FIGS. 3a through 3c utilizes a single stitch, however, a double needle stitch may also be used if desired.

Referring to FIG. 3a there is shown a first garment component 28, a second garment component 30, and a third garment component 32. In the yoke-to-front 24 or yoke-to-back 26 seams of the present invention, the first garment component 28 comprises an outer panel of the shirt yoke 22 of a dress shirt 10. The second garment component 30 comprises an inner panel of the yoke portion 22 of the dress shirt 10, and the third garment component 32 comprises a portion of front 12 or rear panel 14 of a dress shirt 10 adjacent to the yoke seam. The first garment component 28 has a first surface 34 and a second surface 36. The second garment component 30 also has a first surface 38 and a second surface 40. In a similar manner, the third garment component 32 has a first surface 42 and a second surface 44.

A bonding strip 50 forms an integral part of the present invention. The bonding strip 50 has a first surface 52 and a second surface 54. In the preferred embodiment of the invention and as shown in the Figures, the bonding strip 50 is an adhesive web consisting entirely of an adhesive material. The adhesive material is preferably composed of a polyamide, polyester, or an olefinic material such as a low density polyethylene. Other thermoplastic materials such as polyurethane and ethylene vinylacetate copolymer can also be used. The aforementioned adhesive are preferable because they all have a low melting point in the range of 60–160 degrees celsius. In the preferred embodiment, the adhesive web is produced from a plurality of filaments having a diameter ranging between 20–80 microns. Furthermore, the adhesive web of the present invention has a density of approximately 10–100 grams per square meter. Alternatively, a more solid structured net adhesive may be used having a density preferably in a range of 8–80 grams per square meter. Other types of adhesives may be contemplated without departing from the concept of the present invention provided the adhesive is suitable to bind a cloth material and sewing thread and will not degrade during laundering operations.

The bonding strip 50, first garment component 28, second garment component 30, and third garment component 32 are positioned as shown in FIGS. 3a–3c. As depicted in FIG. 3a, the first garment component 28 is reverse folded over the bonding strip 50 such that the first surface 34 of the first garment component 28 abuts the first or upper surface 52 of the bonding strip 50. A stitch 56 is then sewn to attach together the reverse folded portion of the first garment component 28, the bonding strip 50, the unfolded portion of the first garment component 28, the third garment component 32, and the second garment component 30. Next, the second garment component 30 is reverse folded such that the lower surface 40 of the second garment component 30 abuts itself as illustrated in FIG. 3b.

The production of the improved yoke seam of the present invention is completed with the application of heat and pressure to the seam. This process is depicted by directional arrows 60 in FIG. 3c and is usually carried out on a heated press with a temperature of from 60 to 160 degrees celsius for 5 to 10 seconds followed with a vacuum step to cool and set the adhesive. The applied heat and pressure causes adhesive of the bonding strip 50 to melt and flow onto the reversed surfaces 34 of the first component 28. That is, the adhesive flows onto the first surface 34 of the first garment component 28 along a second surface 54 of the bonding strip 50 and concomitantly along a first surface 52 of the bonding strip 50 to the reversely bent surface 34 of the yoke panel 28. During the ironing/pressing process 60, the flowing adhesive becomes interposed in the garment fabric interstices of the first component 28 and the sewing thread 56. This is advantageous because it creates a very strong bond along the seam. It is this bond that prevents seam pucker during subsequent laundering operations. In particular, because the first component 28 and thread 56 are bonded together along the seam, they are locked into position during laundering operations, thus preventing seam puckering. This is a significant advantage over the prior art seams which permit the fabric to become separated during subsequent laundering operations which in turn results in seam pucker. The ironing/pressing process 60 also compresses the seam to reduce the seam thickness as illustrated in FIG. 3c.

In this embodiment of the present invention the stitch 56 does not extend through to the reverse folded portion of the second garment component 30, which is the inner yoke panel of a dress shirt 10. This reverse fold portion of a dress shirt is a fabric layer which abuts the wearer's skin. In this stitching configuration, the added discomfort of stitching thread against the wearer's skin is avoided while still maintaining a smooth pucker free exterior seam around the yoke portion of a dress shirt 10.

The reverse folded portion of the first garment component 28 is the visible portion of the yoke-to-front 24 and yoke-to-back 26 seams. As such, it is advantageous to have the adhesive of the bonding strip 50 flow over the entire surface of the reverse folded portion of the first garment component 28 which abuts the bonding strip 50. This will ensure bonding of the first surface 34 of the reverse folded portion of the first garment component 28 to the first surface 52 of the bonding strip 50 and the first surface 34 of the unfolded portion of the first garment component 28 to the second surface 54 of the bonding strip 50, thus eliminating any visible seam pucker.

Although in the preferred embodiment the bonding strip 50 consists of an adhesive web as described above, other elements are contemplated. In an alternative embodiment the bonding strip 50 consists of an interlining having an adhesive coating on its outer surfaces. Interlinings are known in the art to provide stiffness to garment components. For example, interlinings are used in shirt collars and center plackets to provide a degree of stiffness. However, the interlining of the present invention utilizes an adhesive on its outer surfaces and is specifically used for garment seams. More specifically, the interlining body of the present invention is preferably a woven interlining made from cotton or a polyester/cotton blend. Alternatively, a nonwoven interlining body made from polyester, nylon, viscose or blends of these materials may be used. Preferably, the interlining body is fabricated from a single material so as to avoid the high cost associated with producing composite interlinings. The interlinings have a coating of an adhesive on an upper and lower surface. The adhesive is preferably one of the same thermal adhesives previously mentioned in the adhesive web embodiment discussed above. The adhesive may be applied on the upper and lower surfaces of the interlining as an adhesive layer or as a series of adhesive dots. Significantly, a quantity of adhesive sufficient to flow over the garment surfaces as described above is needed in order to provide complete bonding as contemplated by the present invention. Although this interlining embodiment is adequate to achieve the results of the present invention, it is not preferable because of the increased production cost associated with providing a separate interlining.

Another preferred embodiment of the present invention includes an alternative stitching configuration as depicted in FIGS. 4a and 4b. In this embodiment, the stitching of the seam comprises sewing a stitch 66 extending along the seam through the reverse folded portion of the first garment component 28, the bonding strip 50, the unfolded portion of the first garment component 28, the third garment component 32, the unfolded portion of the second garment component 30, and the reverse folded portion of the second garment component 30. The steps of applying heat and pressure remain unchanged as illustrated by directional arrows 68 in FIG. 4b.

SUMMARY OF MAJOR ADVANTAGES OF THE INVENTION

After reading and understanding the foregoing detailed description of an inventive yoke seam and method for production in accordance with preferred embodiments of the invention, it will be appreciated that several distinct advantages of the subject yoke seam and method for production are obtained.

Without attempting to set forth all of the desirable features of the instant garment seam and method for production, at least some of the major advantages include providing a pucker free yoke by using a bonding strip which provides for a pucker free garment seam which has not been successfully accomplished by prior art attempts. Preferably, the bonding strip comprises an adhesive web which flows during ironing onto the abutting surfaces of the garment components to create a very strong bond along the garment seam and sewing thread. This bond helps prevent the garment components from separating during subsequent laundering of the garment. Alternatively, the bonding strip comprises an interlining body having a thermal adhesive coating on its outer surfaces. The interlining body can be fabricated from a single material thus avoiding the use of costly composite interlining body.

The garment seam and method for production of the present invention provides a less costly alternative to other prior art attempts at eliminating seam pucker and without the need for substantial modification of current seam production operations.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which fall within the purview of the subject invention.

What is claimed:

1. A method for producing a smooth garment seam between first and second garment components forming a yoke portion of a shirt, and a third garment component of the shirt said method comprising the steps:

(a) placing the first garment component forming an outer panel of a yoke portion of a shirt in an adjacent relationship to the third garment component so as to define a seam;

(b) placing the second garment component having a first and second surface, and forming an inner panel of the yoke portion of a shirt, in an adjacent relationship to the third garment component so as to further define a seam;

(c) placing a bonding strip having a first and second surface, and at least a thermal adhesive component, along the seam such that the second surface of the bonding strip abuts a first surface of the first garment component;

(d) reverse folding the first garment component over the bonding strip such that the first surface of the first garment component is folded over and abuts the first surface of the bonding strip;

(e) sewing the first, second, and third garment components and the bonding strip together by a stitch extending along the bonding strip;

(f) reverse folding the second garment component such that the second surface of the second garment component abuts itself and the first surface of the second garment component abuts a surface of the third garment component; and (g) applying sufficient heat and pressure to said bonding strip to cause the thermal adhesive to melt such that said adhesive flows onto the first surface of the first garment component along the second surface of the bonding strip and concomitantly along the first surface of the reversely folded first garment component along the first surface of the bonding strip to provide a bond along the seam and around the stitch such that the bonded component will effectively reduce a tendency of the seam to exhibit pucker following laundering operations.

2. A method for producing a smooth garment seam between first and second garment components forming a yoke portion of a shirt and a third garment component of the shirt as defined in claim 1 wherein:

said step of placing a bonding strip comprises placing an adhesive composed of a thermoplastic material.

3. A method for producing a smooth garment seam between first and second garment components forming a yoke portion of a shirt and a third garment component of the shirt as defined in claim 2 wherein:

said step of placing a bonding strip comprises placing an adhesive composed of a thermoplastic material selected from the group consisting of polyamide, polyester, olefinic, polyurethane, and ethylene vinylacetate copolymer materials.

4. A method for producing a smooth garment seam between first and second garment components forming a yoke portion of a shirt and a third garment component of the shirt as defined in claim 1 wherein:

said step of placing a bonding strip comprises placing a thermal adhesive having a melting point ranging from approximately 60 to 160 degrees celsius.

5. A method for producing a smooth garment seam between first and second garment components forming a yoke portion of a shirt and a third garment component of the shirt as defined in claim 1 wherein:

said step of placing a bonding strip comprises placing a thermal adhesive net having a density of approximately 8 to 80 grams per square meter.

6. A method for producing a smooth garment seam between first and second garment components forming a yoke portion of a shirt and a third garment component of the shirt as defined in claim 1 wherein:

said steps of placing first, second, and third garment components comprise placing a first garment component comprising a yoke of a dress shirt, a second garment component comprising an interior yoke of a dress shirt, and a third garment component comprising a panel of a dress shirt.

7. A method for producing a smooth garment seam between first and second garment components forming a yoke portion of a shirt and a third garment component of the shirt as defined in claim 1 wherein:

said steps of placing first, second, and third garment components comprise placing said garment components such that said seam comprises at least one of a yoke-to-front panel and yoke-to-back panel seam of a dress shirt.

8. A method for producing a smooth garment seam between first and second garment components forming a yoke portion of a shirt and a third garment component of the shirt as defined in claim 1 wherein:

the step of applying of heat and pressure comprises ironing and pressing.

9. A method for producing a smooth garment seam between first and second garment components forming a yoke portion of a shirt and a third garment component of the shirt as defined in claim 8 wherein:

the step of applying an ironing and pressing process comprises carrying out the process at a temperature between 60 and 160 degrees celsius for 5 to 10 seconds.

10. A method for producing a smooth garment seam between first and second garment components forming a yoke portion of a shirt and a third garment component of the shirt as defined in claim 1 wherein:

said step of placing a bonding strip comprises placing between the reverse folded first surfaces of the first garment component a thermal adhesive web or net composed entirely of a thermal adhesive.

11. A method for producing a smooth garment seam between first and second garment components forming a yoke portion of a shirt and a third garment component of the shirt as defined in claim 10 wherein:

said step of placing a bonding strip comprises placing a thermal adhesive web composed of a plurality of adhesive filaments having a diameter ranging approximately between 20 to 80 microns.

12. A method for producing a smooth garment seam between first and second garment components forming a yoke portion of a shirt and a third garment component of the shirt as defined in claim 10 wherein:

said step of placing a bonding strip comprises placing a thermal adhesive web having a density of approximately 10 to 100 grams per square meter.

13. A method for producing a smooth garment seam between first and second garment components forming a yoke portion of a shirt and a third garment component of the shirt as defined in claim 1 wherein:

said step of placing a bonding strip comprises placing an interlining having a quantity of thermal adhesive on first and second surfaces.

14. A method for producing a smooth garment seam between first and second garment components forming a yoke portion of a shirt and a third garment component of the shirt as defined in claim 13 wherein:

said step of placing a bonding strip comprises placing a woven interlining fabricated from cotton.

15. A method for producing a smooth garment seam between first and second garment components forming a yoke portion of a shirt and a third garment component of the shirt as defined in claim 13 wherein:

said step of placing a bonding strip comprises placing a woven interlining fabricated from polyester/cotton blend.

16. A method for producing a smooth garment seam between first and second garment components forming a yoke portion of a shirt and a third garment component of the shirt as defined in claim 13 wherein:

said step of placing a bonding strip comprises placing a nonwoven interlining fabricated from a material selected from the group consisting of polyester, nylon, and viscose and blends thereof.

17. A method for producing a smooth garment seam between first and second garment components forming a yoke portion of a shirt and a third garment component of the shirt as defined in claim 1 wherein:

said step of applying heat and pressure comprises applying said heat and pressure for at least 5 seconds.

18. A method for producing a smooth garment seam between first and second garment components forming a yoke portion of a shirt and a third garment component of the shirt as defined in claim 1 wherein:

said step of sewing comprises sewing through the reverse folded over portion of the first garment component, the bonding strip, the unfolded portion of the first garment component, the third garment component, and the unfolded portion of the second garment component.

19. A method for producing a smooth garment seam between first and second garment components forming a yoke portion of a shirt and a third garment component of the shirt as defined in claim 1 wherein:

said step of sewing comprises sewing through the reverse folded over portion of the first garment component, the bonding strip, the unfolded portion of the first garment component, the third garment component, the unfolded portion of the second garment component, and a reverse folded portion of the second garment component.

20. A method for producing a smooth garment seam between first and second garment components forming a yoke portion of a shirt and a third garment component of the shirt as defined in claim 1 wherein:

said step of placing a bonding strip comprises placing a generally rectangular strip positioned between the reverse folded first surfaces of the first garment component without forming a fold in the generally rectangular strip.

21. In a clothing garment having between first and second garment components forming a yoke portion of a shirt and a third garment component of the shirt a smooth seam comprising:

a bonding strip having at least a thermal adhesive component and having a first and second surface;

a first garment component forming an outer panel of a yoke portion of a shirt having a first and second surface, the first garment component being reverse folded over the bonding strip such that an unfolded portion of the first surface of the first garment component is bonded to said second surface of the bonding strip and the first surface of the first garment component is also bonded to said first surface of the bonding strip;

a second garment component forming an inner panel of the yoke portion of the shirt having a first surface and a second surface, the second garment component being reverse folded such that the second surface of the second garment component abuts itself;

a third garment component having a first and second surface positioned such that a portion of said first surface of the third garment component abuts the second surface of the first garment component and a portion of the second surface of the third garment component abuts the first surface of the second garment component;

a stitch extending along the seam sewing the first, second, and third garment components and the bonding strip together; and the bonding strip of this seemed being subjected to a sufficient amount of heat and pressure to cause the thermal adhesive to bond the first garment component along a lower surface of said bonding strip and concomitantly along an upper surface of said bonding strip such that a bond is formed by the bonding strip along the seam to reduce a tendency to pucker following laundering operations.

22. In a clothing garment having between first and second garment components forming a yoke portion of a shirt and a third garment component of the shirt a smooth seam as defined in claim 21 wherein:

said adhesive is composed of a thermoplastic material.

23. In a clothing garment having between first and second garment components forming a yoke portion of a shirt and a third garment component of the shirt a smooth seam as defined in claim 22 wherein:

said adhesive is composed of a thermoplastic material selected from the group consisting of polyamide, polyester, olefinic, polyurethane, and ethylene vinylacetate copolymer materials.

24. In a clothing garment having between first and second garment components forming a yoke portion of a shirt and a third garment component of the shirt a smooth seam as defined in claim 21 wherein:

said thermal adhesive has a melting point ranging from approximately 60 to 160 degrees celsius.

25. In a clothing garment having between first and second garment components forming a yoke portion of a shirt and a third garment component of the shirt a smooth seam as defined in claim 21 wherein:

said bonding strip is a thermal adhesive net having a density of approximately 8 to 80 grams per square meter.

26. In a clothing garment having between first and second garment components forming a yoke portion of a shirt and a third garment component of the shirt a smooth seam as defined in claim 21 wherein:

said first garment component comprises a yoke panel of a dress shirt;

said third garment component comprises at least one of a front and a rear panel of a dress shirt; and said second garment component comprises an interior yoke panel of a dress shirt.

27. In a clothing garment having between first and second garment components forming a yoke portion of a shirt and a third garment component of the shirt a smooth seam as defined in claim 21 wherein:

said seam comprises at least one of a yoke-to-front or yoke-to-back seam of a dress shirt.

28. In a clothing garment having between first and second garment components forming a yoke portion of a shirt and a third garment component of the shirt a smooth seam as defined in claim 21 wherein:

said heat and pressure are accomplished by an ironing and pressing process.

29. In a clothing garment having between first and second garment components forming a yoke portion of a shirt and a third garment component of the shirt a smooth seam as defined in claim 28 wherein:

the ironing and pressing process is carried out at a temperature between 60 and 160 degrees celsius for 5 to 10 seconds.

30. In a clothing garment having between first and second garment components forming a yoke portion of a shirt and third garment component of the shirt a smooth seam as defined in claim 21 wherein:

said bonding strip comprises a thermal adhesive web composed entirely of a thermal adhesive.

31. In a clothing garment having between first and second garment components forming a yoke portion of a shirt and a third garment component of the shirt a smooth seam as defined in claim 30 wherein:

said thermal adhesive web is composed of a plurality of adhesive filaments having a diameter ranging approximately between 20 to 80 microns.

32. In a clothing garment having between first and second garment components forming a yoke portion of a shirt and a third garment component of the shirt a smooth seam as defined in claim 30 wherein:

said thermal adhesive web has a density of approximately 10 to 100 grams per square meter.

33. In a clothing garment having between first and second garment components forming a yoke portion of a shirt and a third garment component of the shirt a smooth seam as defined in claim 21 wherein:

said bonding strip comprises an interlining having on a first and a second surface a quantity of thermal adhesive.

34. In a clothing garment having between first and second garment components forming a yoke portion of a shirt and a third garment component of the shirt a smooth seam as defined in claim 33 wherein:

said interlining comprises a woven interlining fabricated from cotton.

35. In a clothing garment having between first and second garment components forming a yoke portion of a shirt and a third garment component of the shirt a smooth seam as defined in claim 33 wherein:

said interlining comprises a woven interlining fabricated from polyester/cotton blend.

36. In a clothing garment having between first and second garment components forming a yoke portion of a shirt and a third garment component of the shirt a smooth seam as defined in claim 33 wherein;

said interlining is a nonwoven interlining fabricated from a material selected from the group consisting of polyester, nylon, and viscose and blends thereof.

37. In a clothing garment having between first and second garment components forming a yoke portion of a shirt and a third garment component of the shirt a smooth seam as defined in claim 21 wherein:

said heat and pressure are applied for at least 5 seconds.

38. In a clothing garment having between first and second garment components forming a yoke portion of a shirt and a third garment component of the shirt a smooth seam as defined in claim 21 wherein:

said bonding strip comprises a generally rectangular strip positioned between the reverse folded first surface of the first garment component without forming a fold in the rectangular strip.

39. In a clothing garment having between first and second garment components forming a yoke portion of a shirt and a third garment component of the shirt a smooth seam as defined in claim 21 wherein:

said stitch traverses through the reverse folded portion of the first garment component, the bonding strip, the unfolded portion of the first garment component bonded to the second surface of the bonding strip, the third garment component, and the unfolded portion of the second garment component which abuts the third garment component.

40. In a clothing garment having between first and second garment components forming a yoke portion of a shirt and a third garment component of the shirt a smooth seam as defined in claim 21 wherein:

said stitch traverses through the reverse folded portion of the first garment component, the bonding strip, the unfolded portion of the first garment component bonded to the second surface of the bonding strip, the third garment component, the unfolded portion of the second garment component which abuts the third garment component, and the portion of the reverse folded second garment component whose second surface abuts itself.

41. A method for producing a pucker free garment seam joining first and second garment components forming a yoke portion of a shirt, and a third garment component of the shirt, said method comprising the steps:

(a) providing a first garment component forming an outer panel of a yoke portion of a shirt and having a first and a second surface;

(b) providing a second garment component forming an inner panel of the yoke portion of a shirt and having a first and a second surface;

(c) providing a third garment component in a juxtaposed relationship with respect to the first and second garment components to be joined at a seam to the first and second garment components;

(d) providing a bonding strip having a first and a second surface and at least a thermal adhesive component and placing the bonding strip along the seam formed by positioning the first garment component, the second garment component, and the third garment component such that the second surface of the bonding strip contacts the first surface of the first garment component along the seam;

(e) reverse folding the first garment component over the bonding strip such that the first surface of the first garment component is folded over and abuts the first surface of the bonding strip along the seam;

(f) sewing a stitch along the seam such that it traverses through at least the reverse folded portion of the first garment component, the third garment component, and the second garment component;

(g) reverse folding the second garment component such that the second surface of the second garment component abuts itself and the first surface of the second garment component abuts a surface of the third garment component along the seam; and (h) applying sufficient heat and pressure to the bonding strip to cause the thermal adhesive to melt such that the adhesive flows onto the first surface of the first garment component along the second surface of the bonding strip and concomitantly along the first surface of the bonding strip to provide a bond along the seam such that the bonded component will effectively reduce a tendency of the seam to exhibit pucker following laundering operations.

42. A method for producing a smooth garment seam between first and second garment components forming a yoke portion of a shirt and a third garment component of the shirt as defined in claim 41 wherein:

said step of placing a bonding strip comprises placing an adhesive composed of a thermoplastic material.

43. A method for producing a pucker free garment seam joining first and second garment components forming a yoke portion of a shirt, and a third garment component of the shirt as defined in claim 41 wherein:

said step of placing a bonding strip comprises placing a thermal adhesive having a melting point ranging from approximately 60 to 160 degrees celsius.

44. A method for producing a pucker free garment seam between first and second garment components forming a yoke portion of a shirt and a third garment component of the shirt as defined in claim 41 wherein:

said step of placing a bonding strip comprises placing a thermal adhesive net having a density of approximately 8 to 80 grams per square meter.

45. A method for producing a pucker free garment seam between first and second garment components forming a yoke portion of a shirt and a third garment component of the shirt as defined in claim 41 wherein:

the step of applying heat and pressure comprises the step of ironing and pressing at a temperature between 60 and 160 degrees celsius for 5 to 10 seconds.

46. A method for producing a pucker free garment seam between first and second garment components forming a yoke portion of a shirt and a third garment component of the shirt as defined in claim 41 wherein:

said step of placing a bonding strip comprises placing between the reverse folded first surfaces of the first garment component a thermal adhesive web or net composed entirely of a thermal adhesive.

47. A method for producing a pucker free garment seam between first and second garment components forming a yoke portion of a shirt and a third garment component of the shirt as defined in claim 46 wherein:

said step of placing a bonding strip comprises placing a thermal adhesive web composed of a plurality of adhesive filaments having a diameter ranging approximately between 20 to 80 microns.

48. A method for producing a pucker free garment seam between first and second garment components forming a yoke portion of a shirt and a third garment component of the shirt as defined in claim 41 wherein:

said step of placing a bonding strip comprises placing an interlining having a quantity of thermal adhesive on upper and lower surfaces.

49. A method for producing a pucker free garment seam between first and second garment components forming a yoke portion of a shirt and a third garment component of the shirt as defined in claim 41 wherein:

said step of sewing comprises sewing through the reverse folded over portion of the first garment component, the bonding strip, the unfolded portion of the first garment component, the third garment component, and the unfolded portion of the second garment component.

50. A method for producing a pucker free garment seam between first and second garment components forming a yoke portion of a shirt and a third garment component of the shirt as defined in claim 41 wherein:

said step of sewing comprises sewing through the reverse folded over portion of the first garment component, the bonding strip, the unfolded portion of the first garment component, the third garment component, the unfolded portion of the second garment component, and the reverse folded portion of the second garment component.

51. A method for producing a pucker free garment seam between first and second garment components forming a yoke portion of a shirt and third garment component of the shirt as defined in claim 41 wherein:

said step of placing a bonding strip comprises placing a generally rectangular strip positioned between the reverse folded first surface of the first garment component without forming a fold in the generally rectangular strip.

52. In a shirt having first and second components forming a yoke portion of the shirt and a third component of the shirt all joined together in a pucker free seam, said pucker free seam comprising:

a bonding strip having at least a thermal adhesive component and having a first and second surface;

a first garment component forming an outer panel of a yoke portion of a shirt having a first and a second surface, reverse folded over the bonding strip such that a portion of the first surface of the first garment component is bonded to the first surface of the bonding strip and the unfolded portion of the first surface of the first garment component is bonded to the second surface of the bonding strip;

a second garment component forming an inner panel of the yoke portion of the shirt having a first and second surface;

a third garment component having a first and second surface positioned such that a portion of the first surface of the third garment component abuts the second surface of the unfolded portion of the first garment component;

a stitch extending along the seam and traversing through at least the reverse folded portion of the first garment component, the bonding strip, the third garment component and the second garment component;

the second garment component being reverse folded such that a portion of the first surface of the second garment component abuts at least a portion of the second surface of the third garment component along the seam and a portion of the second surface the second garment component abuts itself; and the bonding strip of the seam being subjected to a sufficient amount of heat and pressure to cause the thermal adhesive to bond at its second surface to the first surface of the unfolded portion of the first garment component and concomitantly at the first surface of the bonding strip to the first surface of the reverse folded portion of the first garment component such that the bonded component will effectively reduce a tendency of the seam to exhibit pucker following laundering operations.

53. In a shirt having first and second components forming a yoke portion of the shirt and a third component of the shirt all joined together in a pucker free seam, said pucker free seam as defined in claim 52 wherein:

said adhesive is composed of a thermoplastic material.

54. In a shirt having first and second components forming a yoke portion of the shirt and a third component of the shirt all joined together in a pucker free seam, said pucker free seam as defined in claim 52 wherein:

said thermal adhesive has a melting point ranging from approximately 60 to 160 degrees celsius.

55. In a shirt having first and second components forming a yoke portion of the shirt and a third component of the shirt all joined together in a pucker free seam, said pucker free seam as defined in claim 52 wherein:

said bonding strip is a thermal adhesive net having a density of approximately 8 to 80 grams per square meter.

56. In a shirt having first and second components forming a yoke portion of the shirt and a third component of the shirt all joined together in a pucker free seam, said pucker free seam as defined in claim 52 wherein:

the heat and pressure process is carried out by ironing and pressing at a temperature between 60 to 160 degrees celsius for 5 to 10 seconds.

57. In a shirt having first and second components forming a yoke portion of the shirt and a third component of the shirt all joined together in a pucker free seam, said pucker free seam as defined in claim 52 wherein:

said bonding strip is a thermal adhesive web composed entirely of a thermal adhesive.

58. In a shirt having first and second components forming a yoke portion of the shirt and a third component of the shirt all joined together in a pucker free seam, said pucker free seam as defined in claim 57 wherein:

said thermal adhesive web being composed of a plurality of adhesive filaments having a diameter ranging approximately between 20 to 80 microns.

59. In a shirt having first and second components forming a yoke portion of the shirt and a third component of the shirt all joined together in a pucker free seam, said pucker free seam as defined in claim 52 wherein:

said bonding strip comprises an interlining having on upper and lower surfaces a quantity of thermal adhesive.

60. In a shirt having first and second components forming a yoke portion of the shirt and a third component of the shirt all joined together in a pucker free seam, said pucker free seam as defined in claim 52 wherein:

said stitch traverses through the reverse folded portion of the first garment component, the bonding strip, the unfolded portion of the first garment component bonded to the second surface of the bonding strip, the third garment component, and the unfolded portion of the second garment component which abuts the third garment component.

61. In a shirt having first and second components forming a yoke portion of the shirt and a third component of the shirt all joined together in a pucker free seam, said pucker free seam as defined in claim 52 wherein:

said stitch traverses through the reverse folded portion of the first garment component, the bonding strip, the unfolded portion of the first garment component bonded to the second surface of the bonding strip, the third garment component, the unfolded portion of the second garment component which abuts the third garment component, and the portion of the reverse folded second garment component whose second surface abuts itself.

62. In a shirt having first and second components forming a yoke portion of the shirt and a third component of the shirt all joined together in a pucker free seam, said pucker free seam as defined in claim 52 wherein:

said bonding strip is a generally rectangular strip positioned between the reverse folded first surfaces of the first garment component without forming a fold in the rectangular strip.

* * * * *

Disclaimer

5,950,554 — John Wong, Cote St. Luc, Canada. PUCKER FREE YOKE-TO-FRONT AND YOKE-TO-BACK GARMENT SEAM AND METHOD FOR PRODUCTION. Patent dated Sep. 14, 1999. Disclaimer filed Feb. 21, 2006 by the Assignee, Taltech, Limited.

The term of this patent, subsequent to 5,568,779, 5,590,615, 5,713,292, 5,775,394, 5,782,191, 6,070,542 and 6,079,343 has been disclaimed.

(*Official Gazette May 23, 2006*)